United States Patent
Peppers et al.

(10) Patent No.: US 7,237,238 B2
(45) Date of Patent: Jun. 26, 2007

(54) METHOD AND APPARATUS FOR AUTOMATED OPERATING SYSTEMS UPGRADE

(75) Inventors: Cherita Arnece Peppers, Austin, TX (US); David Allen Dyson, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 636 days.

(21) Appl. No.: 10/087,384

(22) Filed: Mar. 1, 2002

(65) Prior Publication Data

US 2003/0167354 A1    Sep. 4, 2003

(51) Int. Cl.
*G06F 9/44* (2006.01)
(52) U.S. Cl. ............. 717/170; 717/169; 717/173
(58) Field of Classification Search ........ 717/168–178, 717/120–123
See application file for complete search history.

(56) References Cited

U.S. PATENT DOCUMENTS

| | | | |
|---|---|---|---|
| 5,577,244 A * | 11/1996 | Killebrew et al. | 717/169 |
| 5,960,189 A * | 9/1999 | Stupek, Jr. et al. | 717/169 |
| 5,983,369 A | 11/1999 | Bakoglu et al. | |
| 6,012,130 A | 1/2000 | Beyda et al. | |
| 6,151,708 A * | 11/2000 | Pedrizetti et al. | 717/173 |
| 6,170,065 B1 | 1/2001 | Kobata et al. | |
| 6,351,850 B1 * | 2/2002 | van Gilluwe et al. | 717/175 |
| 6,513,159 B1 * | 1/2003 | Dodson | 717/178 |
| 6,658,659 B2 * | 12/2003 | Hiller et al. | 717/170 |
| 2002/0100035 A1 * | 7/2002 | Kenyon et al. | 717/168 |

* cited by examiner

*Primary Examiner*—Tuan Dam
*Assistant Examiner*—John Romano
(74) *Attorney, Agent, or Firm*—Haynes and Boone, LLP

(57) ABSTRACT

A method for an automated operating system upgrade in an information handling system, from an older version to a newer version including initiating a preparation for the upgrade from an operating system upgrade preparation media. An eligibility of the information handling system for upgrade in response to the preparation is determined. The upgrade proceeds in response to an eligibility determination, otherwise upgrade preparation is terminated.

16 Claims, 4 Drawing Sheets

METHOD AND APPARATUS FOR AUTOMATED OPERATING SYSTEMS UPGRADE

BACKGROUND

The disclosures herein relate generally to information handling systems and more particularly to a method and apparatus for automated operating systems upgrade.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Operating systems of computers are subject to being upgraded. In prior operating system upgrade procedures for computers, a computer system user or customer would typically be provided a written listing of information relating to software programs and drivers that had been predetermined as non-compatible with a new operating system. Accordingly, for a customer to upgrade his or her computer system to the new operating system, the customer would be required to gather up all information relating to and/or needed for performing the operating system upgrade directly from the computer system and possibly from other sources. Subsequent to obtaining the necessary information, the customer would be required to compare the user obtained computer system information with a list of non-compatible software programs and drivers provided with the new operating system media. Such a procedure, however is time consuming, prone to error, and may require intervention and assistance by a trained technical support specialist.

Therefore, what is needed is a method and apparatus for an automated operating system upgrade.

SUMMARY

According to one embodiment, a method for an automated operating system upgrade in an information handling system, from an older version to a newer version, includes initiating a preparation for the upgrade from an operating system upgrade preparation media. An eligibility of the information handling system for upgrade in response to the preparation is determined. Lastly, the upgrade proceeds in response to an eligibility determination, otherwise upgrade preparation is terminated.

A principal advantage of this embodiment is reducing errors and eliminating a requirement for intervention and assistance by a trained technical support specialist in the upgrading of an operating system from an older version to a newer version.

DETAILED DESCRIPTION

Figure 1:
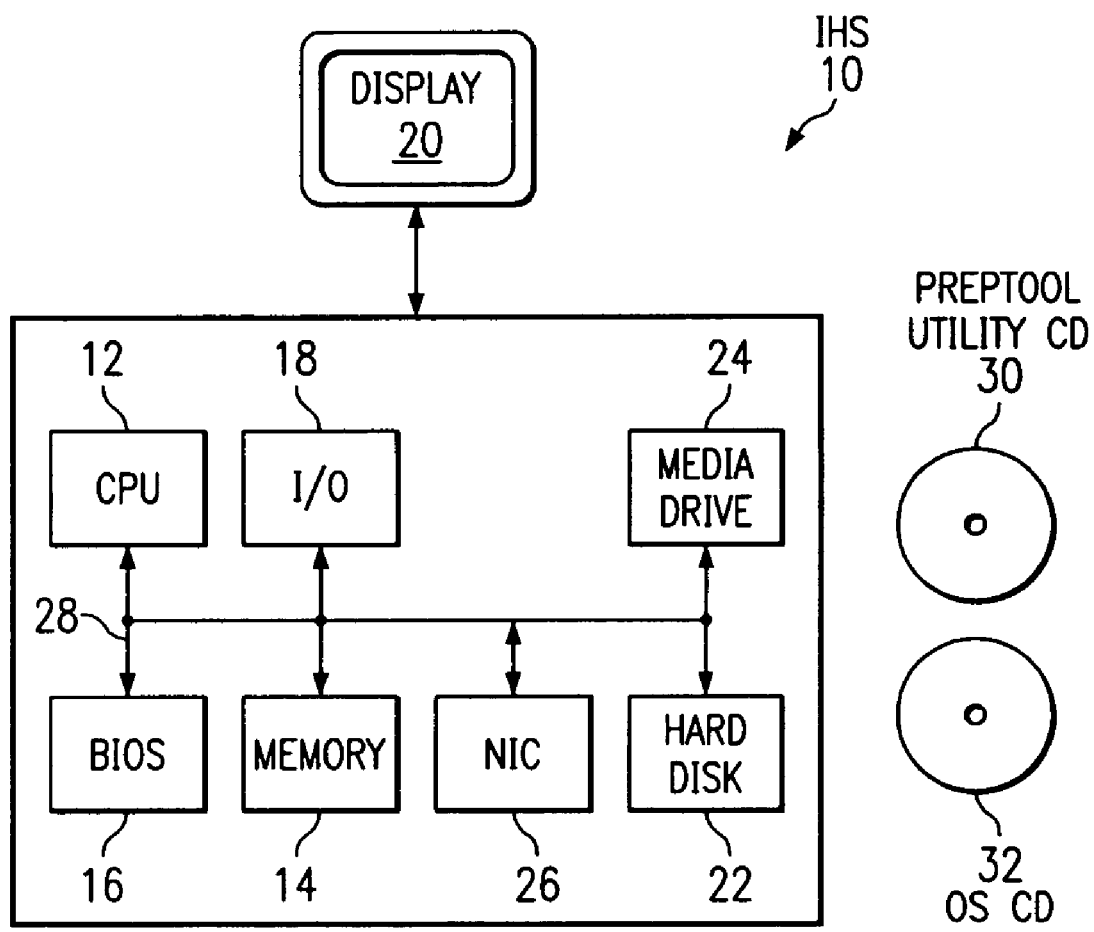
FIG. 1 is a block diagram view of an information handling system according to one embodiment of the present disclosure.

Referring now to FIG. 1, according to one embodiment, an information handling system includes a computer system 10 configured in accordance with a custom configured computer system order or plan in a build to order manufacturing environment. The computer system 10 includes a central processing unit (CPU) 12, memory 14, BIOS 16, input/output (I/O) devices, such as a keyboard, a mouse, and associated controllers, collectively designated by a reference numeral 18, a display 20, a hard disk drive 22, and other storage devices, such as may include a floppy disk drive, a CD-ROM drive, and the like, collectively designated by a reference numeral 24, and various other subsystems, such as a network interface card, collectively designated by a reference numeral 26, all interconnected via one or more buses, shown collectively as a bus 28. One or more computer readable media 30, such as a floppy disk, CD-ROM, or the like, may also be included. In one embodiment, media 30 includes an operating system upgrade preparation CD. An additional computer readable media 32 is also provided and includes, for example, an upgrade CD containing the new operating system software.

For purposes of this disclosure, an information handling system may also include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

According to one embodiment of the present disclosure, a software based method provides automatic data querying of a target computer system in preparation for an operating system upgrade to a new operating system. The upgrade preparation method includes scanning a current computer system configuration and populating an upgrade preparation file with information regarding at least one of a BIOS manufacturer, a BIOS Version, a computer system unique identifier, drivers, and software applications. Due to potential incompatibilities, one or more of the present BIOS, drivers, and software applications may be required to be updated or uninstalled prior to installing the new operating system.

The upgrade preparation method further includes providing a display of one or more of the BIOS manufacturer of the current installed BIOS, BIOS version, System identification, drivers, and software applications. In one embodiment, the display includes an HTML web page display format. In addition to providing a listing of the one or more BIOS manufacturer, BIOS version, system identification, drivers and software applications, the display further includes information regarding the steps for completion of a specific task or tasks. Accordingly, the display provides for a smoother customer experience to achieving an upgrade of the customer computer system to the new operating system.

Figure 2:
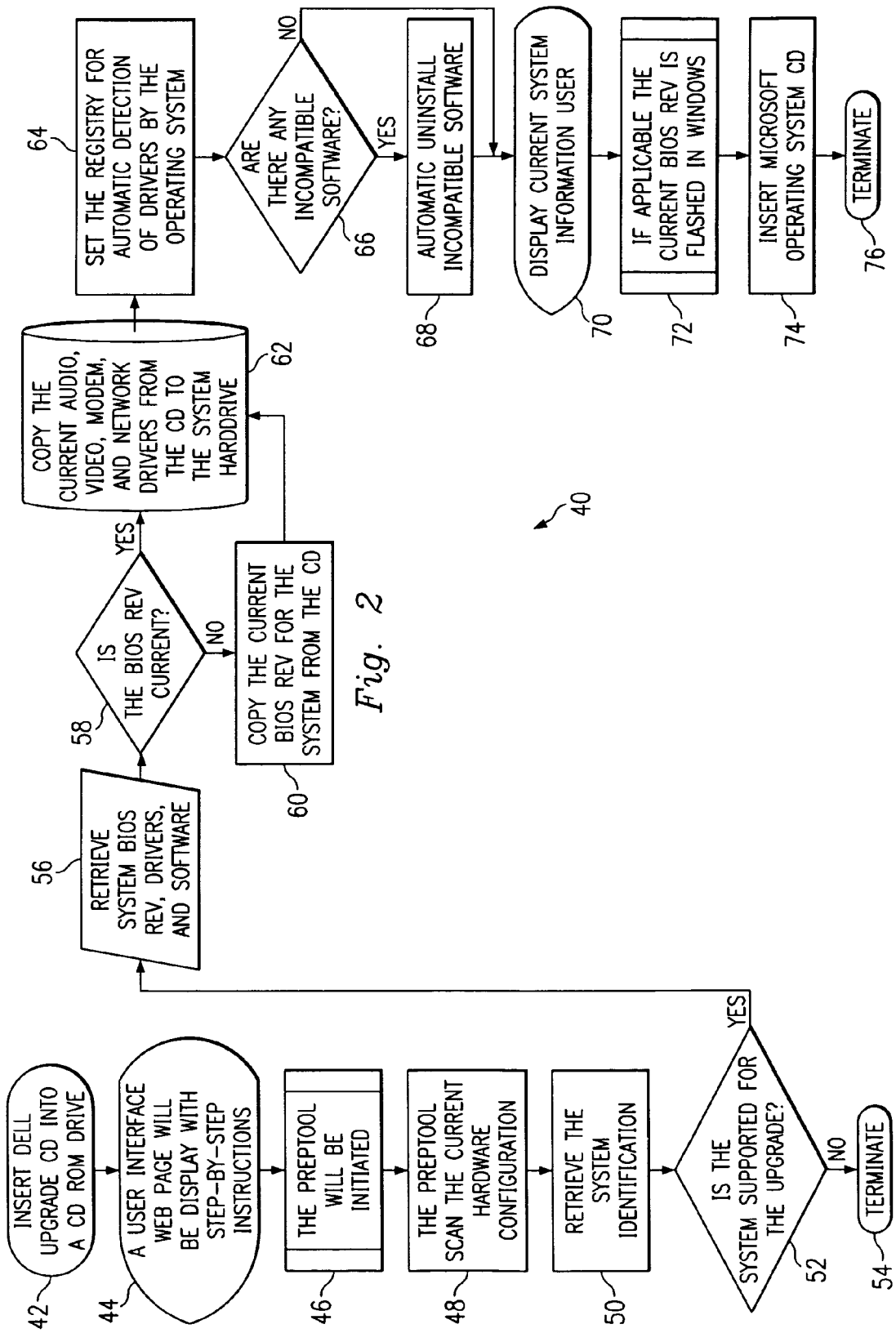
FIG. 2 is a flow diagram view of a method for automatic operating systems upgrade according to one embodiment of the present disclosure.

Referring now to FIG. 2, a flow diagram 40 of a method for automatic operating systems upgrade according to one embodiment of the present disclosure is shown. According to the embodiment, a target system user begins the upgrade preparation process at Step 42 by inserting media CD 30 into the CD ROM drive 24 on the target system 10 (FIGS. 1 and 2). An upgrade tools CD program on media 30 starts either by an auto-run mechanism or by manually starting the CD program.

Upon execution, the upgrade preparation program provides a user interface (UI) at Step 44. The user interface informs the user as to what steps are to be executed for the upgrade preparation and may also provide other relevant information. That is, the information may include information about possible future incompatibilities or other known upgrade issues. Accordingly, the upgrade preparation program gives the target system user the opportunity to provide informed consent to the process.

Responsive to consent of the user for performing the upgrade preparation as described in the initial screen of the UI, the upgrade preparation program passes control to a preptool in Step 46. The preptool corresponds to a module of software that queries the target computer system, as discussed further herein.

In Step 48, the preptool operates to obtain a first piece of information, the first piece of information corresponding to the BIOS ID type. The preptool returns the BIOS ID byte in Step 50 and uses this information to determine whether or not the particular model of the target computer system is eligible for the upgrade in Step 52. If the target system is not eligible, the upgrade preparation program notifies the user that the Operating System upgrade is not supported, and the process ends without modification of the target system. If the target system is supported, then the process continues to the next step, at Step 54.

The preptool operates to obtain a second piece of information in Step 56, the second piece of information corresponding to the BIOS type and revision information (BIOS Rev). The preptool returns the BIOS type and revision information. The preptool further operates in Step 56 to obtain information on drivers and software applications that have been installed on the target system.

Responsive to collection of the information, the preptool compares the information to a table of supported BIOS, drivers, and software applications, the table of supported BIOS, drivers, and software applications having been compiled through an independent testing and evaluation process. In Step 58, if a new BIOS is needed on the target computer system 10, the new BIOS is copied to a directory structure on the hard disk drive HDD 22 of the target system 10 at Step 60. Similarly, if new drivers are needed to support the new operating system, then the new drivers are copied to the directory structure in Step 62. In addition, in Step 64, the registry is configured to use the new directory structure to search for new drivers.

In Step 66, the information on the software applications that has been collected is examined to determine if there are any incompatibilities that need to be addressed before the upgrade.

If the process in Step 66 has uncovered one or more software applications that need to be uninstalled, the preptool is configured to bring up a dialog box listing the one or more software applications needing attention. The dialog box allows the user to initiate an automatic un-installation of the respective software applications in Step 68. If the process in step 66 uncovers no software applications to be uninstalled, then the process continues to Step 70.

In Step 70, the preparation program presents a display document to the user, for example, via a displayed web page. The document contains current information about the target computer system, and may include a listing of the steps that have been taken to prepare the target computer system for the operating system upgrade.

If, based upon information obtained during the preparation, the BIOS is scheduled to be upgraded, then an upgrade of the BIOS is started automatically prior to the ending of the upgrade CD preparation program in Step 72. Subsequent to the ending of the upgrade CD preparation program in Step 72, the target system is then rebooted.

A computer system is "booted"(or "rebooted") when it initiates execution of operating system software (e.g., Microsoft Windows™) in response to an event ("boot event"). Such a boot event may be, for example, a user "turning on" the computer (e.g., the user causing application of electrical power to the computer by switching an on/off button of the computer). Alternatively, such a boot event may be receipt by the computer of a command to initially execute the operating system software. For example, the computer may receive such a command from the user (e.g., through input devices of the computer system), or from a computer application executed by the computer, or from another computer (e.g., through a network that is connected to the computer). Such booting of the computer system may be referred to as a computer system boot process, or a computer system boot operation.

After a reboot of the target system 10, the user is instructed to insert the OS Upgrade CD 32 into the target system to complete the upgrade process at Step 74. With the modifications that were made to the target system in response to the upgrade preparation, when the OS upgrade searches for drivers for devices, the new drivers that were copied over from the upgrade preparation CD program are used. Accordingly, the need for the target system user to manually install any new drivers required by the new OS at a later time is eliminated. The automatic OS upgrade finishes at Step 76.

Figure 3:
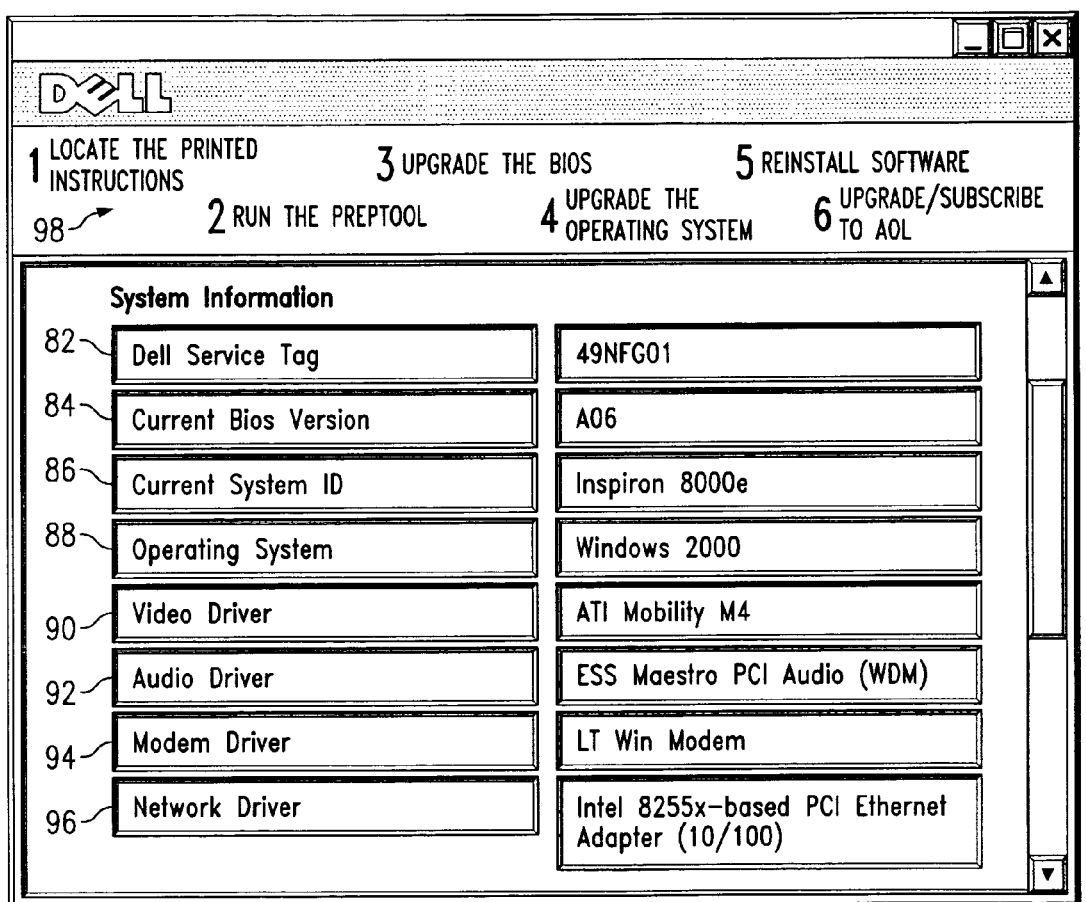
FIG. 3 is an illustrative display screen view of a portion of the automated operating systems upgrade according to another embodiment of the present disclosure.

Referring now briefly to FIG. 3, an illustrative display screen view 80 of a portion of the automated operating systems upgrade process is shown. The display screen view includes a web page, listing system information as uncovered by the preptool preparation program. For example, the listing of system information includes one or more of a Service Tag 82, current BIOS Version 84, Current System ID 86, a current operating system 88, video driver 90, audio driver 92, modem driver 94, and network driver 96. As shown in this example, the Service Tag 82 retrieved by the preptool program included 49NFG01, current BIOS version 84 included A06, current system ID 86 included Inspiron 8000e, operating system 88 included Windows 2000, video driver 90 included ATI Mobility M4, audio driver 92 included ESS Maestro PCI Audio (WDM), modem driver 94 included LT Win Modem, and network driver 96 included Intel 8255x-based PCI Ethernet Adapter (10/100).

The display screen view 80 of FIG. 3 also includes a listing of the various steps in the upgrade process, as indicated generally by the reference numeral 98. The may include, for example: 1) locate the printed instructions, 2) run the preptool, 3) upgrade the BIOS, 4) upgrade the operating system, 5) reinstall software, and 6) upgrade/ subscribe to an online service provider. The display screen view 80 is exemplary of providing a user interface display page, the user interface display page outlining step-by-step upgrade instructions, and the instructions including at least one user-selectable option to continue with the upgrade preparation. That is, steps 1), 2), 3), 4), 5), and 6) can include user selectable options.

Figure 4:
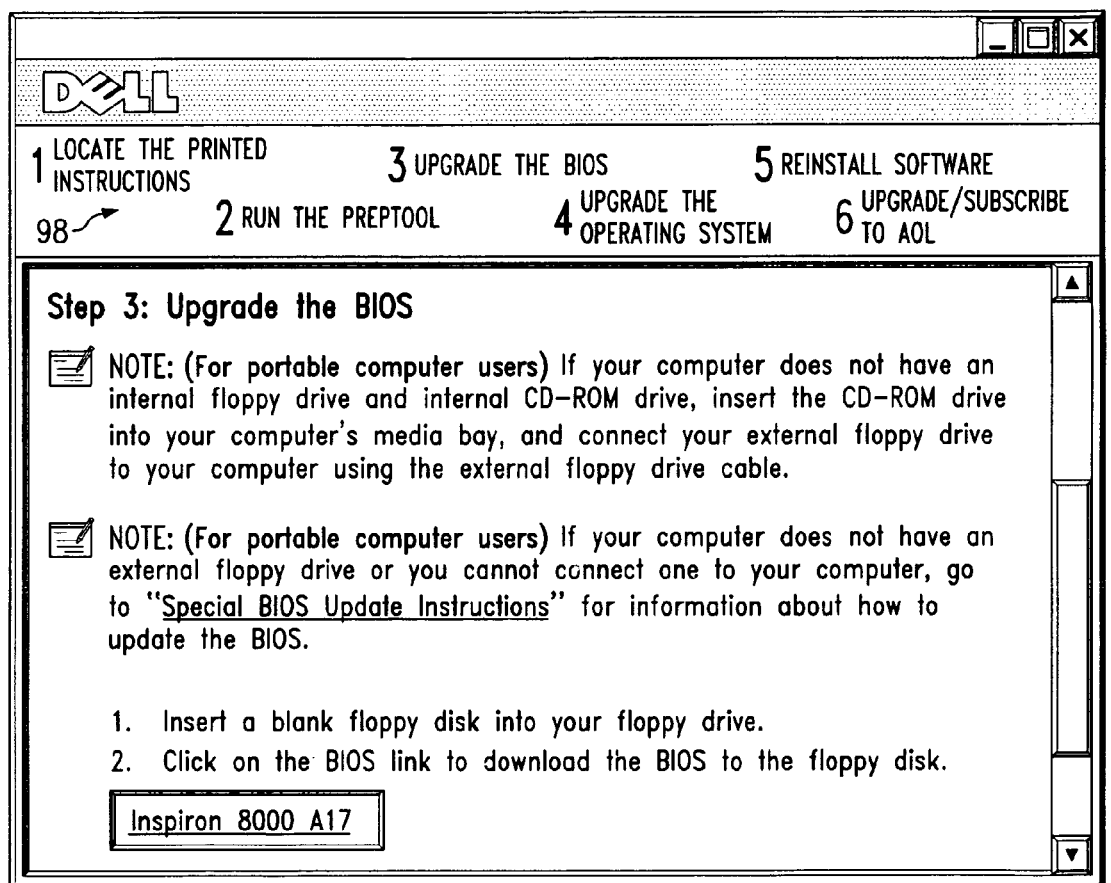
FIG. 4 is an illustrative display screen view of a portion of the automated operating systems upgrade according to another embodiment of the present disclosure.

Referring now to FIG. 4, an illustrative display screen view 100 of a portion of the automated operating systems upgrade according to another embodiment of the present disclosure is shown. The display screen view 100 includes a web page, listing steps in the process for upgrading the BIOS, as discussed herein.

The target computer system 10 of FIG. 1 may also represent an upgrade preparation system for carrying out the upgrade method as discussed herein. In addition, the upgrade preparation method of the present embodiments as described herein can be implemented in software for carrying out the desired functionalities, using programming techniques known in the art.

According to another embodiment of the present disclosure, the automatic upgrade preparation method operates as a stand alone process. In addition to this, the upgrade preparation process operates specifically to work without requiring the intervention or oversight of trained technical support staff.

In one embodiment, the automatic operating system upgrade preparation program is embodied in an upgrade utility CD. The automatic operating system upgrade preparation method of the present disclosure also offers computer users a substantially problem free solution for upgrading a target computer system from an outdated operating system to a newer operating system. Accordingly, concerns whether a target system will break on upgrade, whether the most current drivers required by the newer operating system are on the target system, or whether the installed software applications on the target system are compatible with the newer operating system, are sufficiently addressed for target system users when upgrading the operating system of the respective computer systems.

The Upgrade Utility CD prepares the target computer system for the upgrade so that the target system user has few worries or concerns. The upgrade utility CD program takes care of the concerns by identifying the target computer system and its service tag, and informing the target system user whether the target system is an approved system. That is, the upgrade utility CD program informs the target system user whether or not for the given target system, the system is suitable for a best experience with the new operating system.

The upgrade utility CD program also checks the BIOS REV of the target system. Checking the BIOS REV is an important part of the upgrade process, because if the target computer system contains a non-compatible BIOS REV and an operating system upgrade is done, then the target computer system can be ruined or rendered substantially inoperable. Accordingly, the upgrade utility CD program provides automatic flashing of the target computer system BIOS to a most current BIOS REV, the most current BIOS REV having been tested and approved to work with the new operating system.

The upgrade utility CD program also copies enhanced feature drivers to the target computer system makes any necessary registry changes to point the new operating system to the enhanced feature drivers, instead of the new operating system pointing to the native supported drivers. Accordingly, a target computer system user does not need to be concerned with installing any drivers or even having to know what drivers should be installed, because the upgrade utility CD program addresses that concern.

With respect to the software on the target computer system, the upgrade utility CD performs an incompatibility check of the software. The incompatibility check identifies whether any of the software on the target computer system will not work with the new operating system. The upgrade utility CD program alerts the target system user of uncovered incompatibilities, providing the target system user with a user-selectable option for uninstalling the incompatible software. If a target system user chooses to uninstall the incompatible software, the user simply selects the choice, such as, via a button on a web page display. Responsive to the selected choice, the upgrade utility CD program performs an automatic uninstall of the incompatible software.

In yet another embodiment of the present disclosure, in a first step, the upgrade preparation program is downloaded onto the target computer system. Downloading of the upgrade preparation program includes for example, downloading of upgrade preparation program files from a computer readable media, such as a CD ROM, or other suitable computer readable media, such as an Intranet, Internet, or other global computer network. The files are downloaded to a storage device, such as, a hard disk drive or R/W CD ROM drive on the target computer system.

In a next step, the upgrade program executes the downloaded files in preparation for hardware and software configuration scanning of the target computer system.

First, the upgrade preparation program determines the system identification of the target computer system. The upgrade preparation program uses the system identification to determine whether the new operating system supports the target computer system. In other words, the system identification is required to decide whether or the not the target computer system is supported on the upgrade path.

In a next step, the upgrade preparation program performs a scan for all drivers on the target computer system. Any additional required drivers will subsequently be downloaded to the target system hard drive per system ID, for the drivers to be installed after loading of the new operating system.

In a next step, the upgrade preparation program performs a scan for all drivers on the target computer system. Any additional required drivers will subsequently be downloaded to the target system hard drive per system ID, further the drivers to be installed after loading of the new operating system.

Lastly, the upgrade preparation program scans for factory-installed software that are incompatible with the new operating system. In response to identifying incompatible factory-installed software, the upgrade preparation program prompts the target system user for approval to uninstall the incompatible software. Responsive to an approval, the upgrade preparation program automatically uninstalls the incompatible software. Responsive to a denial, the upgrade preparation program advances to the next step without removing the incompatible software.

The upgrade preparation program includes software for providing a competitive edge in connection with an operating system upgrade program. In addition, the upgrade preparation program provides a lowering of warranty costs for the computer system manufacturer, by automating a preparation in an operating system upgrade process.

Accordingly, the upgrade preparation process gathers information from the target computer system and uses the information to determine a support level for that particular unit. In addition, the upgrade preparation process uses the information to determine which modules of the preparation program to use in the upgrade preparation process.

According to another embodiment, the operating system upgrade method includes preparation for an automated upgrade of an operating system on a single mass storage unit of a target computer system. Accordingly, the automated upgrade of the operating system results in minimal data loss.

When the upgrade preparation program or tool finishes interrogating the target computer system to determine its contents, the upgrade preparation program compares the returned data against a table. The table contains predetermined compatibility results obtained from independent testing. The preparation program uses the comparison results to determine which applications and drivers have been deemed compatible with the new operating system. Responsive to such determinations, the preparation program initiates the removal of software that may be incompatible and prepares a directory for any new drivers that may be needed for proper operation of the new operating system.

One feature of the method of the present embodiments is to willingly, and in a controlled fashion, change the software configuration of a target computer system in an operating system upgrade. Accordingly, the method of the present disclosures enables automatic upgrading of the target computer system with an outdated operating system to a newer version operating system.

Although only a few exemplary embodiments of this disclosure have been described in detail above, those skilled in the art will readily appreciate that many modifications are possible in the exemplary embodiments without materially departing from the novel teachings and advantages of the embodiments of this disclosure. For example, the functionality of the various embodiments as discussed herein can be provided on a single monolithic integrated circuit. Accordingly, all such modifications are intended to be included within the scope of the embodiments of this disclosure as defined in the following claims. In the claims, means-plus-function clauses are intended to cover the structures described herein a the recited function and not only structural equivalents, but also equivalent structures.

What is claimed is:

1. A method for an automated operating system upgrade in an information handling system, from an older version to a newer version, comprising:
   preparing a target information handling system for an upgrade using an upgrade preparation program;
   the program identifying the target system to determine whether a new operating system supports the target system;
   the program identifying an operating system manufacturer end version and determining if the version is older than a current required version;
   the program downloading the new operating system if required;
   copying the new operating system to a directory structure;
   the program scanning for all drivers on the target system;
   the program downloading any additional required drivers to the new directory structure if needed to support the new operating system;
   the program scanning to identify any factory installed software that are incompatible with the new operating system;
   in response to identifying incompatible factory installed software, the program prompting the target system for an approval to uninstall the incompatible software; and
   in response to a denial of the approval, the program advancing to a next step without uninstalling incompatible software.

2. The method of claim 1 further comprising:
   in response to the approval, the program automatically uninstalling the incompatible software.

3. The method of claim 1 further comprising:
   the program comparing data received from the target system against a table.

4. The method of claim 3 comprising:
   the table containing compatible results obtained from independent testing.

5. The method of claim 4, further comprising:
   the program using results of the comparing to determine which applications and drivers of the target system are compatible with the new operating system.

6. The method of claim 4, further comprising:
   the program initiating removal of incompatible software.

7. The method of claim 1, wherein the drivers include at least one of an audio driver, video driver, modem driver, and network driver.

8. The method of claim 1, further comprising:
   displaying upon a display device any current hardware information.

9. A computer program product for implementing an automated operating system upgrade in an information handling system, from an older version to a newer version, comprising:
   a computer program processable by a target information handling system for causing the information handling system to;
   identify the target system to determine whether a new operating system supports the target system;
   identify an operating system manufacturer and version and determine if the version is older than a current required version;
   download the new operating system if required;
   copy the new operating system to a directory structure;
   scan for all drivers on the target system;
   download any additional required drivers to the new directory structure if needed to support the new operating system; and
   scan to identify any factory installed software that are incompatible with the new operating system;
   apparatus from which the computer program is accessible by the information handling system;
   in response to identifying incompatible factory installed software, prompt the target system for an approval to uninstall the incompatible software; and
   in response to a denial of the approval, advance to a next step without uninstalling the incompatible software.

10. The computer program product of claim 9, wherein the program Is processable by the information handling system to:
   in response to the approval, automatically uninstall the incompatible software.

11. The computer program product of claim 9, wherein the program further comprises instructions executable by the information handling system to:
   compare data received from the target system against a table.

12. The computer program product of claim 11, wherein the table contains compatible results obtained from independent testing.

13. The computer program product of claim 12, wherein the program is processable by information handling system to:
   use results of the compared data to determine which applications and drivers of the target system are compatible with the new operating system.

14. The computer program product of claim 13, wherein the program further comprises instructions executable by the information handling system to:
   initiate removal of incompatible software.

15. The computer program product of claim 9, wherein the drivers include at least one of an audio driver, video driver, modem driver, and network driver.

16. The computer program product of 9, wherein the program further comprises instructions executable by the information handling system to:
   display upon a display device any current hardware information.

* * * * *

UNITED STATES PATENT AND TRADEMARK OFFICE
CERTIFICATE OF CORRECTION

PATENT NO.       : 7,237,238 B2
APPLICATION NO.  : 10/087384
DATED            : June 26, 2007
INVENTOR(S)      : Cherita Peppers et al.

Page 1 of 1

It is certified that error appears in the above-identified patent and that said Letters Patent is hereby corrected as shown below:

Claim 1, Column 2, Line 2, delete "end" and insert --and--.

Claim 10, Column 1, Line 2, delete "Is" and insert --is--.

Signed and Sealed this

Twenty-ninth Day of April, 2008

JON W. DUDAS
*Director of the United States Patent and Trademark Office*